(12) United States Patent
Beattie et al.

(10) Patent No.: US 12,557,795 B2
(45) Date of Patent: Feb. 24, 2026

(54) WATER OXYGENATION SYSTEM AND METHOD TO IMPROVE THE EFFICACY AND UTILIZATION OF FISH SLIDES AND LADDERS

(71) Applicant: GIS Gas Infusion Systems Inc., Saint Andrews (CA)

(72) Inventors: Mike Beattie, Saint Andrews (CA); David Glassford, Saint Andrews (CA)

(73) Assignee: GIS Gas Infusion Systems Inc., Saint Andrews (CA)

( * ) Notice: Subject to any disclaimer, the term of this patent is extended or adjusted under 35 U.S.C. 154(b) by 964 days.

(21) Appl. No.: 16/957,247

(22) PCT Filed: Dec. 27, 2018

(86) PCT No.: PCT/CA2018/051672
§ 371 (c)(1),
(2) Date: Jun. 23, 2020

(87) PCT Pub. No.: WO2019/126878
PCT Pub. Date: Jul. 4, 2019

(65) Prior Publication Data
US 2023/0200361 A1     Jun. 29, 2023

Related U.S. Application Data

(60) Provisional application No. 62/610,703, filed on Dec. 27, 2017.

(51) Int. Cl.
*A01K 63/04*          (2006.01)
(52) U.S. Cl.
CPC .......... *A01K 63/042* (2013.01); *A01K 63/047* (2013.01)

(58) Field of Classification Search
CPC ...... A01K 63/042; A01K 63/047; E02B 8/08; E02B 8/085
See application file for complete search history.

(56) References Cited

U.S. PATENT DOCUMENTS 3,478,460 A * 11/1969 Kimble .................. A01K 79/02
                                                            43/4.5
3,778,976 A * 12/1973 Pond .................... A01K 63/042
                                                            96/181
(Continued)

FOREIGN PATENT DOCUMENTS

CN        105900912 A *  8/2016  ........... A01K 63/042
CN        106386650 A *  2/2017  ........... A01K 63/042
(Continued)

OTHER PUBLICATIONS

Rogers G., Total Gas Saturation Considerations for Recirculating Aquatic Systems, 2005, International Journal of Recirculating Aquaculture vol. 6 (2005) 39-48 by Virginia Tech and Virginia Sea Grant. (Year: 2005).*
(Continued)

*Primary Examiner* — Katelyn T Truong
(74) *Attorney, Agent, or Firm* — Crowe & Dunlevy, P.C.

(57)          ABSTRACT

There is provided a system and method for managing fish migration in a body of water in the vicinity of an artificial or natural barrier. The system including a source of saturated water, where the saturated water is water having a dissolved gas level that is higher than that in the body of water. The system also includes outlets in fluid communication with the source of saturated water, each outlet being positioned at a predetermined position in the body of water to eject the saturated water into the predetermined position. The system further includes a pump in fluid communication with the source of saturated water and the outlets for moving the saturated water from the source to the one or more outlets,
(Continued)

wherein flow of the saturated water into the body of water raises the dissolved gas level at the predetermined positions, thereby drawing the fish towards the predetermined positions.

9 Claims, 8 Drawing Sheets

(56) References Cited

U.S. PATENT DOCUMENTS

| | | | | |
|---|---|---|---|---|
| 4,437,431 | A * | 3/1984 | Koch | E02B 8/085 |
| | | | | 405/83 |
| 5,433,554 | A * | 7/1995 | Minakami | E02B 8/085 |
| | | | | 119/219 |
| 6,457,436 | B1 | 10/2002 | Truebe et al. | |
| 7,537,200 | B2 | 5/2009 | Glassford | |
| 8,262,317 | B1 * | 9/2012 | Jensen | E02B 8/085 |
| | | | | 405/83 |
| 10,633,813 | B2 * | 4/2020 | Aittaniemi | E02B 8/085 |
| 2014/0311416 | A1 * | 10/2014 | Stiles, Jr. | B01F 35/82 |
| | | | | 119/263 |
| 2014/0311417 | A1 * | 10/2014 | Stiles, Jr. | A01K 63/006 |
| | | | | 119/263 |
| 2015/0230439 | A1 * | 8/2015 | Harwood | A01K 63/045 |
| | | | | 119/227 |
| 2015/0296754 | A1 * | 10/2015 | Glassford | A01K 63/042 |
| | | | | 119/201 |
| 2016/0174531 | A1 * | 6/2016 | Boothe | F04D 13/0686 |
| | | | | 119/260 |
| 2016/0330943 | A1 * | 11/2016 | Egge | A01K 61/13 |
| 2019/0364856 | A1 * | 12/2019 | Minami | A01K 63/045 |
| 2020/0390071 | A1 * | 12/2020 | Beattie | C02F 1/20 |
| 2020/0406203 | A1 * | 12/2020 | Beattie | B01D 53/18 |

FOREIGN PATENT DOCUMENTS

| | | | | | |
|---|---|---|---|---|---|
| EP | 1002567 | A1 * | 5/2000 | | A01K 63/042 |
| EP | 3239404 | A1 | 11/2017 | | |
| KR | 101782736 | B1 * | 9/2017 | | |
| SU | 1767080 | A1 | 10/1992 | | |
| WO | WO-2004039482 | A2 * | 5/2004 | | A01K 61/10 |
| WO | WO-2013132481 | A1 * | 9/2013 | | A01K 63/04 |
| WO | WO-2017194949 | A1 * | 11/2017 | | A01K 63/042 |

OTHER PUBLICATIONS

Written Opinion of the International Search Authority in PCT/CA2018/051672 dated Apr. 26, 2019.
International Search Report in PCT/CA2018/051672 dated Apr. 26, 2019.

* cited by examiner

WATER OXYGENATION SYSTEM AND METHOD TO IMPROVE THE EFFICACY AND UTILIZATION OF FISH SLIDES AND LADDERS

TECHNICAL FIELD

The invention relates generally to a system, method and use of dissolving gas into a liquid and, more particularly, for directing biomass around a dam.

BACKGROUND

While dams are valuable for flood control, power generation, and the creation of recreational areas, they present significant health risks for migratory fish that need to move downstream and upstream as part of their life cycle. Even for non-migratory fish, dams present health risks from turbine intakes, nets, and other types of turbine barriers.

To address these problems, traditionally, turbine by-pass pipes have been used to direct fish to the fish ladder. These large pipes are commonly used to create a current for attracting fish to the fish ladders. However, the water directed through the turbines often confuse the fish at the base of a dam, and the fish are unable to distinguish the fish ladder from the turbine.

SUMMARY

This disclosure describes a system for managing fish migration in a body of water in the vicinity of an artificial or natural barrier; the system comprising:

a source of saturated water, the saturated water comprising water having a first gas dissolved therein to a level that is higher than that in the body of water;

one or more outlets in fluid communication with the source of saturated water, each outlet being positioned at a predetermined position in the body of water to eject the saturated water into the predetermined position; and a pump in fluid communication with the source of saturated water and the one or more outlets for moving the saturated water from the source to the one or more outlets, wherein flow of the saturated water into the body of water raises the dissolved gas level at the predetermined positions, thereby drawing the fish towards the predetermined positions.

This disclosure also describes a method for managing fish migration in a body of water in the vicinity of an artificial or natural barrier; the method comprising:

raising a dissolved gas level at one or more predetermined positions in the body of water, the higher dissolved gas level in the one or more predetermined positions drawing the fish towards the predetermined positions.

BRIEF DESCRIPTION OF THE DRAWINGS

Reference will now be made, by way of example, to the accompanying drawings which show an example of the present application, in which.

DESCRIPTION OF INVENTION

Figure 1:
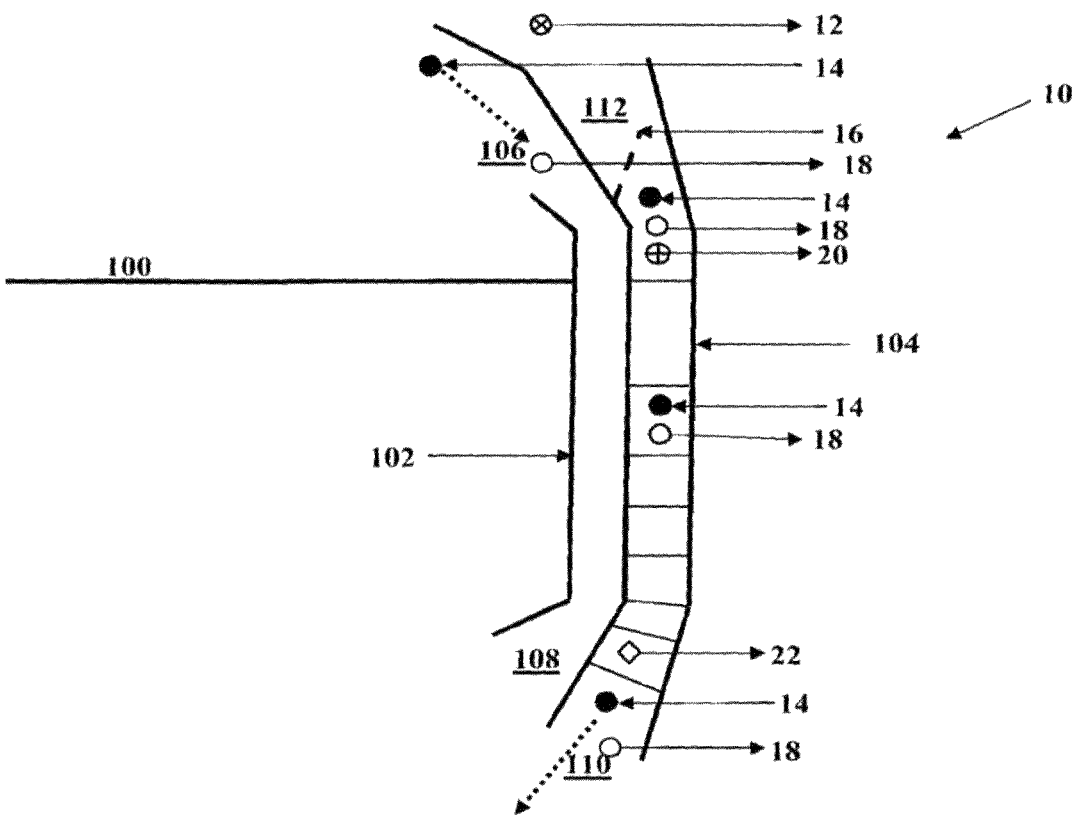
FIG. 1 is a schematic of a dam in which an embodiment of a system according to an example of the present invention is incorporated.

An example embodiment of a fish management system 10 for managing fish migration in a body of water in the vicinity of an artificial or natural barrier will be discussed. Fish management system 10 is positioned relative to a dam 100 and includes an oxygen generation system 50 for generating oxygen, and a saturator system 70, for dissolving the oxygen. A method if their use will also be discussed.

The present invention relies on autonomous motivators of fish behavior. To that end, there are several targets: water temperature, level of illumination within water, food, water current, and dissolved oxygen.

Of these, the most powerful target is dissolved oxygen. This reflects the reality that fish typically expend 35% of their energy acquiring sufficient oxygen through their gills. Oxygen levels also have a profound impact on the life cycle for fish. Higher oxygen levels promote greater egg-laying, along with healthier and larger fry. Higher oxygen levels also promote greater feeding and conversion of food into biomass.

Given the limited dissolved oxygen levels within water bodies, the drive for oxygen by fish is natural. Moreover, the levels of dissolved oxygen can vary widely and rapidly within a water body. For example, rapid dissolved oxygen depletion can occur at night as phytoplankton can no longer use photosynthesis to take in energy. So they then must absorb dissolved oxygen to utilize their energy reserves through respiration. Another common example concerns an increase in water temperature which results in lower dissolved oxygen levels.

The drive for dissolved oxygen within fish, shell fish, and crustaceans is autonomous. It is driven by chemosensory neuroepithelial cells (NECs) located in the epithelial layer of the primary gill filaments. These drive autonomous cardio-respiratory reflexes and behavior modification. NECs release serotonin in response to the dissolved oxygen level. As a neurotransmitter, serotonin drives fish to seek oxygen-rich waters. As the dissolved oxygen levels sufficiently rise, the increasing levels of serotonin cause the fish to calm. In fact, many fish will simply stop swimming and just feed when dissolved oxygen levels reach 150% of saturation or higher. This is because they do not need to swim to drive water through their gills to absorb sufficient oxygen. Under such a setting, the fish are profoundly relaxed and can be very easy to handle. This can be used advantageously for medically treating otherwise traumatized fish in ocean cages, ship wells, or hatcheries.

In the present invention, fish management system 10 utlizies this natural autonomous motivator to guide the fish towards fish ladders and fish slides.

In the depicted embodiment, fish management system 10 is positioned in the vicinity of dam 100, which has a fish slide 102 and a fish ladder 104. Fish slide 102 includes a slide entrance 106, positioned upstream of dam 100, and a slide exit 108, positioned downstream of dam 100. Fish ladder 104 includes a ladder entrance 110 positioned downstream of dam 100 and a ladder exit 112 positioned upstream of dam 100.

Fish management system 10 will first be described in detail.

Fish Management System

The invention is a system for addressing the issues associated with fish migration. Fish management system 10 includes a source of saturated water, and one or more outlets in fluid communication with the source of saturated water. The saturated water is water with a first gas (in this embodiment, the first gas is oxygen) dissolved therein to a level that is higher than the level of dissolved oxygen in the body of water in the vicinity of dam 100. In this case, saturated water may also be referred to as oxygenated water.

In the embodiment depicted, the source of saturated water is a combination of oxygen generation system 50 and saturator system 70.

Oxygen generation system 50 comprises a controller 52 which is operatively coupled to an oxygen generator 54. The oxygen generator 54 is adapted to generate oxygen for storage in oxygen tank 56. Oxygen generation system 50 further includes a pressure sensor 58 within oxygen tank 56, which in turn is operatively coupled to controller 52.

Oxygen tank 56 is further in fluid communication with saturator system 70. Saturator system 70 itself includes a saturator 72, to which oxygen tank 56 is fluidly engaged, and a pump 74, which is positioned upstream of saturator 72 and also in fluid communication with saturator 72. Pump 74 is adapted to direct unsaturated water from upstream of barrier 100 to saturator 72.

Saturator 72 is configured to dissolve oxygen into the water and to simultaneously remove a second gas, such as carbon dioxide or nitrogen, from the water to produce the saturated water.

Saturator system 70 further includes a water output manifold 75 positioned downstream of saturator 72 in fluid communication therewith. Finally, saturator system 70 includes a control and monitoring system 76 which is operatively engaged with pump 74 and oxygen tank 56 in order to control the amount of water and oxygen entering into saturator 72.

Pump 74 is further in fluid communication the one or more outlets for moving the saturated water from saturator 72 to the one or more outlets.

Fish management system 10 further includes a water temperature sensor 12 situated within the head pond of dam 100, a ladder flow gate 16 situated at the ladder exit 112, a dissolved oxygen sensor 18 positioned immediately downstream of each outlet, a water flow rate sensor 20 positioned along fish ladder 104, and a fish monitoring system 22 positioned proximate ladder entrance 110.

Water temperature sensor 12, ladder flow gate 16, dissolved oxygen sensor 18, water flow rate sensor 20, and fish monitoring system 22 are all operatively connected to control and monitoring system 76.

Fish management system 10 includes one or more outlets in fluid communication with the source of saturated water. The outlets are positioned at one or more predetermined positions in the body of water to eject saturated water into the predetermined positions. The predetermined positions define at least a part of a path that the fish may use to navigate around the barrier. Thus the predetermined positions, and their corresponding injection points 14, as shown, are positioned about and along fish slide 102 and fish ladder 104.

In particular, one predetermined position is located proximate slide entrance 106. Its corresponding injection point 14 (i.e. one outlet) is positioned proximate slide entrance 106. A second predetermined position is located proximate ladder entrance 110, thus, a second injection point 14 is situated proximate ladder entrance 110. A third predetermined position is located proximate ladder entrance 110, thus, a third injection point 14 is situated proximate ladder exit 112. Finally, a fourth predetermined position is located between ladder entrance 110 and ladder exit 112. Thus, a fourth injection point 14 is also positioned between ladder entrance 110 and ladder exit 112 within fish ladder 104.

Whereas a specific embodiment of a fish management system is herein shown and described, variations are possible. In some examples, rather than a fish ladder, fish management system 10 may be positioned relative to a fish lift, such as a commercial fish lift or a "Hydroconnect" system.

In other examples, fish management system 10 further includes a control valve at each outlet, each control valve being operatively coupled to control and monitoring system 76, and adapted to selectively control the ejection of saturated water from its corresponding outlet.

In other examples, rather than each outlet being in fluid communication with a single saturator 72, saturator system 70 may have multiple saturators 72, where each outlet is in fluid communication with one of the saturators.

In other examples, rather than having an oxygen generation system 50, fish management system 10 may simply have an oxygen tank 56 which is in fluid communication with saturator system 70.

In yet further examples, should it be desirable that a gas other than oxygen be dissolved in the water, oxygen generation system 50 may simply be a gas generation system 50, which is adapted to generate the other gas for storage in gas tank 56.

Method and Use

Figure 2:
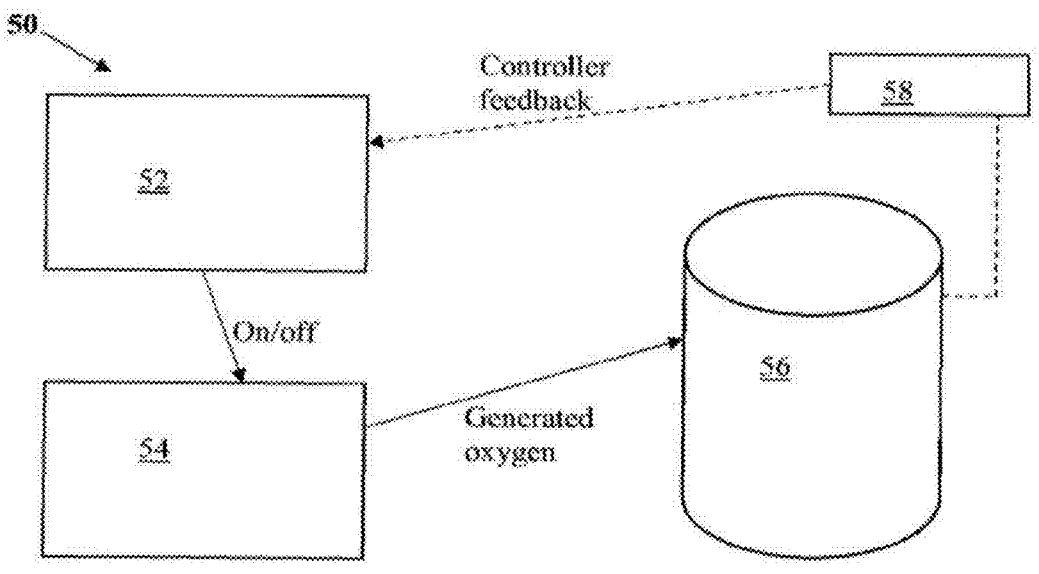
FIG. 2 is a schematic of an oxygen generation system used in the system of FIG. 1.
Figure 3:
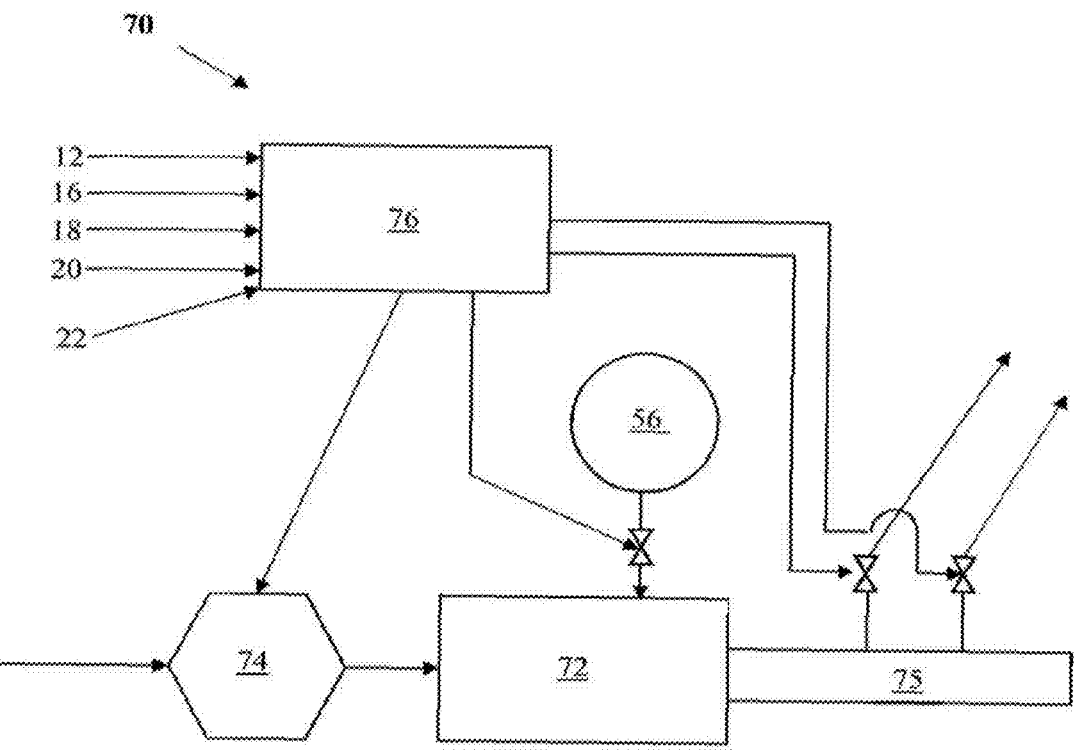
FIG. 3 is a schematic of a saturator system used in the system of FIG. 1.

Referring to FIGS. 1 to 3, fish management system 10 is used for managing fish migration in a body of water in the vicinity of dam 100. The method includes raising the dissolved gas level, e.g. oxygen level, without significantly increasing the total gas pressure, at one or more predetermined positions in the body of water. In this case, the gas being oxygen, it is the presence of the higher dissolved oxygen level in the one or more predetermined positions that attract the fish to migrate towards those predetermined positions. The predetermined positions are indicated herein as injection points 14.

In this embodiment, raising the dissolved gas concentration level involves injecting saturated water into the body of water at the one or more predetermined positions. As noted above, the saturated water has a higher dissolved oxygen level than the dissolved oxygen level at the one or more predetermined positions. In this manner, the saturated water is injected into the body of water at the one or more predetermined positions until the dissolved oxygen level is raised to 10-25% above the highest baseline ambient dissolved oxygen levels at the one or more predetermined positions. The higher concentration levels are usually found within the cavitation zone adjacent to the turbines of the dam. As understood by the skilled person, dissolved oxygen levels under ambient conditions are around 85 to 90 percent saturation.

When fish management system 10 is positioned in the vicinity of dam 100, which has a fish slide 102 and a fish ladder 104, saturated water is injected through an outlet into an injection point 14 proximate slide entrance 106. Saturated water is also injected through an outlet into an injection point 14 proximate ladder entrance 110, into an injection point 14 proximate ladder exit 112, and into an injection point 14 that is situated between ladder entrance 110 and ladder exit 112.

It is well understood that water runs from slide entrance 106 and ladder exit 112 downstream to slide exit 108 and ladder entrance 110, respectively. As such, injecting saturated water upstream of dam 100 proximate slide entrance 106 creates a plume of highly oxygenated water that naturally flows towards, and down, fish slide 102. For fish seeking to travel downstream past dam 100, the flow of highly oxygenated water towards ladder entrance 110 attracts and draws the fish towards slide entrance 106 and, preferably, away from the turbine inlet and barriers of dam 100.

Injecting saturated water downstream of dam 100 proximate ladder entrance 110 creates a plume of highly oxygenated water proximate ladder entrance 110 that naturally dissipates away from fish ladder 104. However, the presence of highly oxygenated water proximate ladder entrance 110 attracts and draws the fish towards ladder entrance 110 at the bottom of dam 100.

As the fish naturally have to exert themselves jumping up the ladder, oxygen is not only needed to attract the fish at the bottom of dam 100, but the extra oxygen further helps in terms of enabling them to have more energy to move up the ladder.

With that in mind, the oxygenated water is also injected proximate ladder exit 112. Since water generally flows from ladder exit 112 to ladder entrance 110, the oxygenated water injected proximate ladder exit 112 will naturally flow down fish ladder 104. This additional oxygenated water may be useful for the fish as they move up the ladder Due to the fish traversing fish ladder 104, and the natural splashing of water on fish ladder 104, the dissolved oxygen content in the saturated water from ladder exit 112 will progressively drop as it flows down fish ladder 104. For this reason, and depending on the length of fish ladder 104, oxygenated water is also injected between ladder exit 112 and ladder entrance 110 to assist the fish in their travel upstream past dam 100.

The oxygen to be dissolved in the water is generated using oxygen generation system 50, which feeds oxygen tank 56. Oxygen generator 54 is configured to operate when the pressure in oxygen tank 56 drops below a specified minimum point. Conversely, oxygen generator 54 turns off when the pressure in oxygen tank 56 rises above a specified maximum point. Pressure sensor 58, situated within oxygen tank 56, sends signals to controller 52, which in turn, activates or deactivates oxygen generator 54. Oxygen generated by oxygen generator 54 is directed into oxygen tank 56, which in turn, supplies oxygen through controlled regulators to saturator 72 in saturator system 70.

Saturator 72 receives water from pump 74. Pump 74 draws water from upstream of dam 100, such as from a head pond and directs it to flow through saturator 72. This water passes through saturator 72, along with the oxygen from oxygen tank 56. Saturator 72 "exchanges" the oxygen with the carbon dioxide in the unsaturated water (i.e. dissolves the oxygen into the water while removing the carbon dioxide from the water) to generate the saturated water, or highly oxygenated water, with little to no increase in the total gas pressure in the oxygenated water. The oxygenated water exits saturator 72 to an output water manifold 75, which directs the oxygenated water to the outlets which are regulated by control valves and which are positioned about dam 100.

The injection of oxygenated water is controlled by control and monitoring system 76, which determine the flow of oxygenated water based on data from the dissolved oxygen sensor 18, head pond water temperature sensor 12, fish monitoring system 22, the time of day, the calendar date, and other information. To regulate the flow of oxygenated water, control and monitoring system 76 also controls the flow rate of saturator feed pump 74, the flow rate through the saturator system's gas input regulator, and the flow through the control valves on the saturator system's output water manifold 75.

In a similar manner, the upstream flow gate 16 of fish ladder 104 is monitored and controlled based on the flow rate through fish ladder 104, the head pond water temperature, and fish monitoring system 22. Fish monitoring system 22 records the species, size, and entrance time for each fish entering the ladder.

Control and monitoring system 76 further coordinates pump 74 with oxygen tank 56 in order to control the amount of water and oxygen entering into saturator 72. All of the control systems, sensors, and monitoring systems associated with this invention can be remotely monitored and controlled through a communication network.

Whereas a specific embodiment of a fish management method is herein shown and described, variations are possible. In some examples, it will be desirable to inject oxygenated water multiple points along fish ladder 104 between ladder entrance 110 and ladder exit 112.

In other examples, rather than a dam, the barrier are locks or a waterfall.

An advantage of the present fish management system 10 and method is that it takes advantage of the natural drive in a fish for higher concentrations of dissolved oxygen to create maximized zones of fish attraction both above and below a dam to attract fish to the dam's fish slide and fish ladder. In this way, fish behavior is autonomously altered to avoid the hazards associated with turbine intakes and barriers above the dam.

Likewise, fish behavior is autonomously altered below the dam to avoid the slightly elevated dissolved oxygen levels associated with turbine cavitation that would otherwise also lure fish seeking to move upstream. This autonomous alteration of fish behavior is achieved by creating dissolved oxygen plumes as noted above with concentrations as low as 104% of saturation coming from the base of the fish ladder, or leading to the top of the fish slide.

Another advantage of the present invention is that the increased oxygen content in the water promotes the growth and health of the fish.

A further economic benefits of the present invention is that it will reduce the need to have a turbine by-pass pipe at the fish ladder. These large pipes are commonly used to create a current for attracting fish to the fish ladders. Since dissolved oxygen has a much stronger autonomous attraction for fish, the by-pass water can instead be directed to the turbines for power production.

The following tests were conducted to demonstrate one or more of these advantages.

Test Procedure

Waters of varying oxygen saturation levels were generated by infusing either oxygen or nitrogen to raise or lower the measured/targeted dissolved oxygen (DO) levels respectively. Oxygen treated fresh water was held in 2 header tanks (1.3 m$^3$ each) outside of the curtained off area where the two-current flume choice tank was located.

Figure 4:
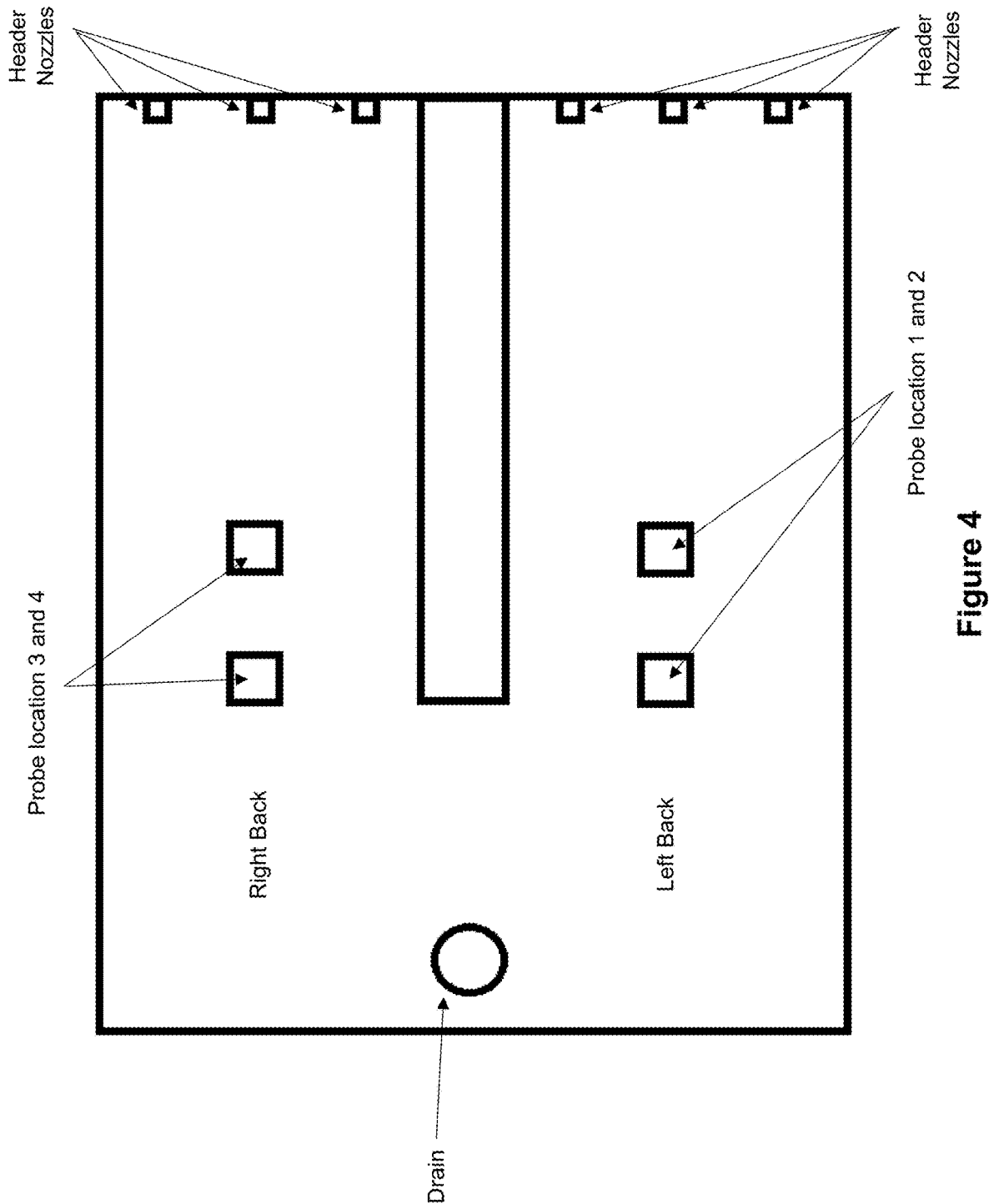
FIG. 4 is a tank diagram used during testing.

Pre-trial (no fish) studies were carried out using the following procedures:

1. Addition of different coloured dyes to each header tank to ascertain minimal crossover of flumes within the tank, (See FIG. 4)
2. Validation of the variable pump controls to ensure that current speeds for both flumes were statistically similar,
3. Measurement of DO levels along the entire length of both flume sides and decision area to determine DO gradients. Due to the influence of light on fish behavior, light measurements, using a lux meter, were taken throughout the entire test tank to ensure even intensity and distribution.
4. Testing of the switch valves, utilizing DO meters, to ascertain the time to achieve a total switch (high to low right side and low to high left side).

DO levels were adjusted in header tanks (1.3 m³) located outside of the curtained off study area, within the same room. The outflow water from the header tanks were further regulated by a series of valves, adjacent to the header tanks, that would direct water from each header tank to either the right or left side of the 2-flume tank. The valves thus allowed the technician to alter high/low sides without interrupting the trial or entering the curtained off trial area. The switch of high/low sides could be carried out as often as desired, therefore eliminating either left or right bias or fish behavior and utilizing the same fish for the entire trial sequence.

Study fish were held in a communal holding tank (1.3 m³) within the HMSC Small Fieldhouse aquatic animal wet laboratory. Trial/study fish were fed daily and were randomly removed from the holding tank and immediately placed in the 2-flume choice tank for any given trial. The same fish were not used for more than a single trial, but they were exposed to 2 or more switches (left side high/right side low to left side low/right side high) for each trial. The technician would then switch the low/high sides of the flume tank and the same fish would be transferred from the bucket back for acclimation in the flume tank and the beginning of a new trial/run.

All trials were recorded by an overhead GoPro Hero3+ camera. The camera was plugged in to avoid battery issues. Blue-tooth technology was used to remotely monitor the fish behavior and ensure that real time video recordings were occurring for the entire trial period. Data collection was based on the location of study fish within the 2-flume tank as analyzed for each GoPro video.

For each trial, fish (10) were held in the acclimation enclosure in the decision arena of the test tank to acclimate for 10 minutes. After the acclimation period, the acclimation enclosure was removed, and the fish were free to swim throughout the decision arena and within each of the flume channels. For this study, each trial, fish (1, 10, 11, 20) were transferred from the communal holding tank and placed into the channel with the highest DO levels. A 5-minute acclimation period allowed fish to move freely about the entire tank.

Figure 5:
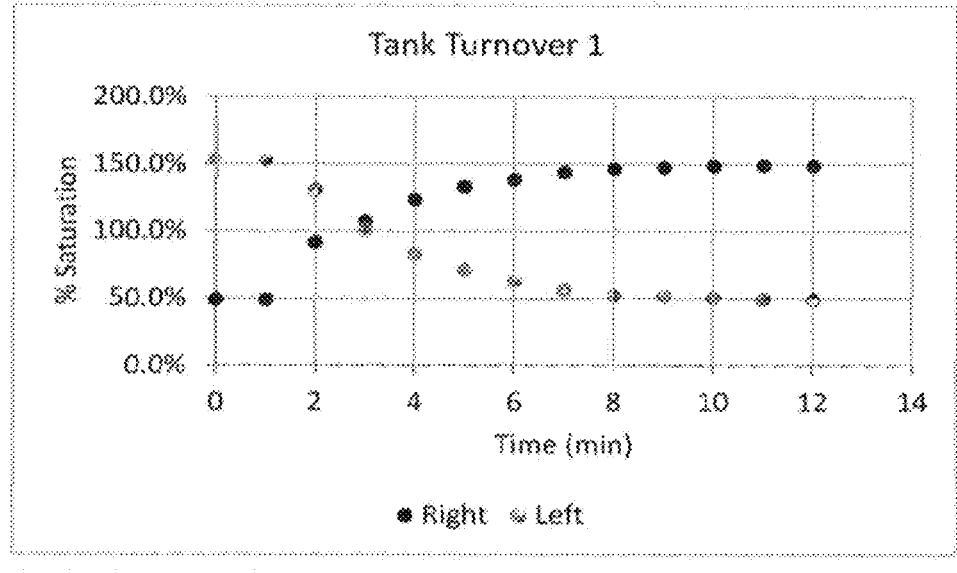
FIGS. 5 and 6 are graphs illustrating the tank turnover data.
Figure 5:
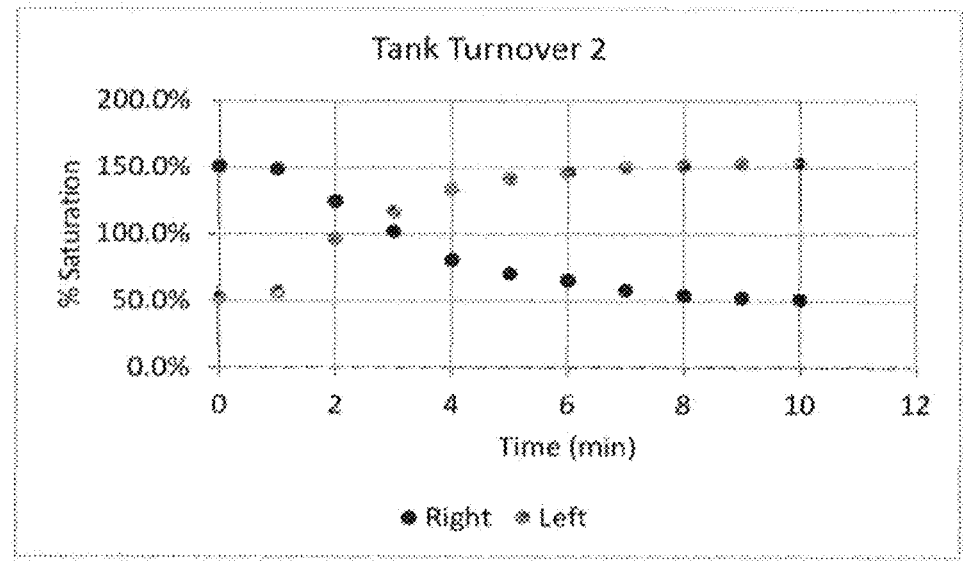
Figure 6:
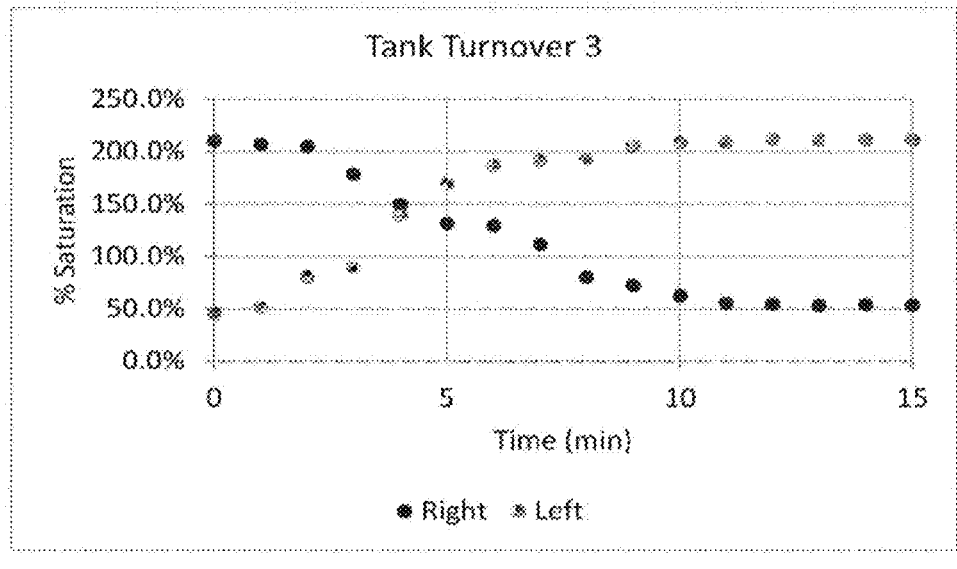
Figure 6:
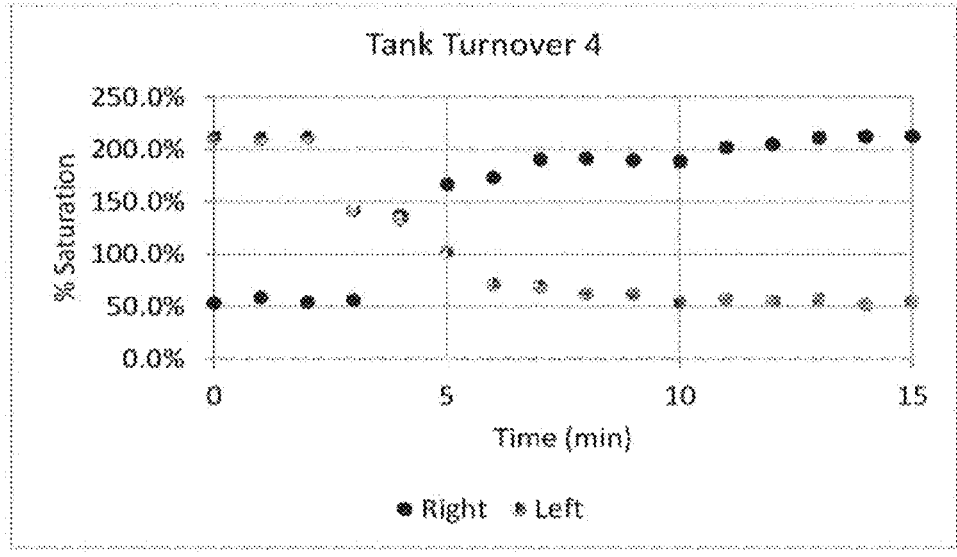

After the acclimation period, the technician would simultaneously switch the high DO side to low DO and vice versa for the other side. Fish were then given another 6 minutes to explore/re-establish a new location within the tank prior to the start of 10 second interval fish counts. The rationale for the 6-minute time frame was linked back to pre-trial DO measurements which indicated that flume channels re-established a constant DO level, along the entire channel length, 6 minutes after a switch was initiated (See FIGS. 5 and 6). For each trial, a minimum of 2 switches would occur, utilizing the same population/group of fish. 10 second interval fish counts were carried out for a minimum of 4 minutes and up to a maximum of 14 minutes dependent on whether the pre-determined trial length was established at 10 or 20 minutes in duration.

All trials were performed using fresh water at ambient temperatures (12 C+/−0.5° C.).

Five separate trials were carried out utilizing a single fish (n=1) with variations in DO levels; 3 trials where high DO levels were 210% DO and low DO levels were 50% DO (a total of 6 switches), 1 trial where high DO levels were 150% DO and low DO levels were 88% DO (ambient) (a total of 2 switches), and 1 trial where high DO levels were 200% DO and low DO levels were 90% DO (ambient) (a total of 2 switches).

One trial was carried out utilizing 20 fish (n=20) where high DO levels were 200% DO and low DO levels were 90% DO (ambient) (a total of 3 switches).

Two trials were carried out utilizing 11 fish (n=11) where high DO levels were 200% DO and low DO levels were 45% DO (a total of 4 switches).

Four trials were carried out utilizing 10 fish (n-10); three trials where high DO levels were 200% DO and low DO levels were 90% DO (ambient) (a total of 6 switches). One trial where high DO levels varied from 140%-130% DO and low DO levels were constant at 90% DO (ambient) (a total of 3 switches).

A total of 26 switches occurred during the study period.

All data was QC/QA by personnel not directly associated with any of the laboratory trials. Checking all data associated with fish counts carried out every 10 seconds (2,184 individual counts) only 5/2,184 counts were shown to be in error.

Test Results

Figure 7:
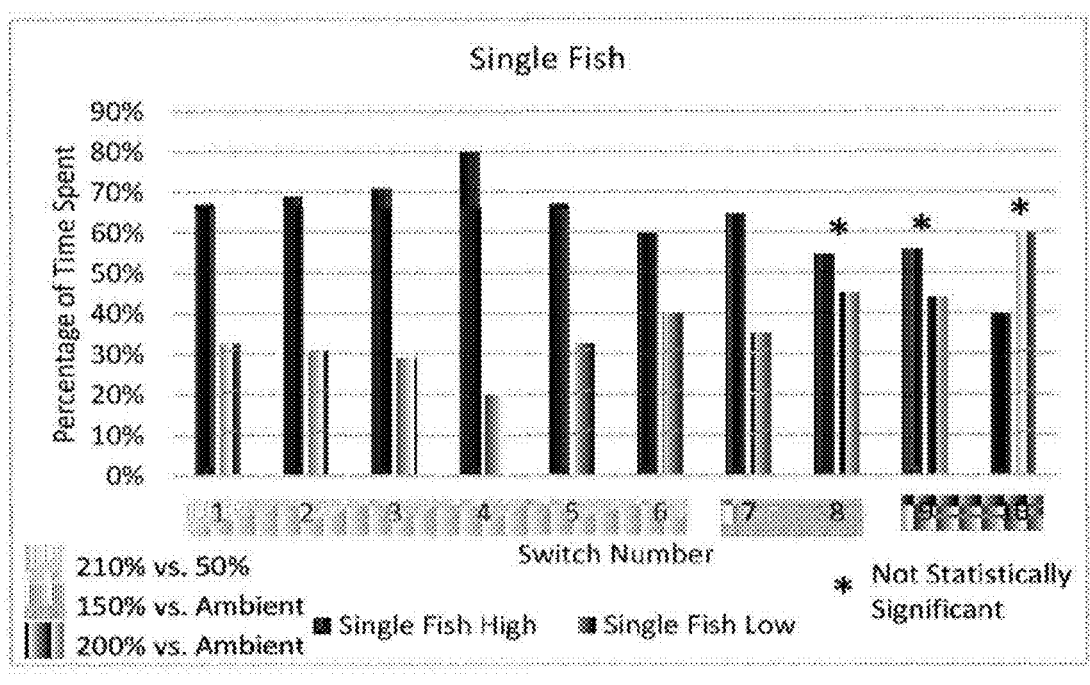
FIGS. 7 to 9 are graphs illustrating summaries of the test trial data.
Figure 8:
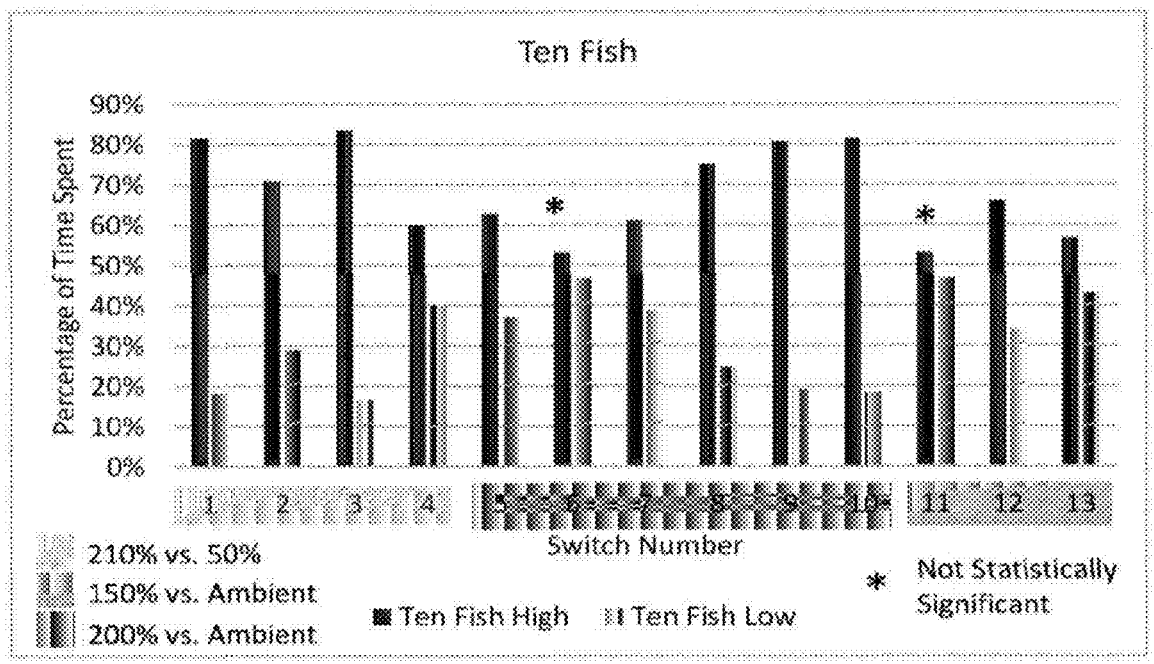
Figure 9:
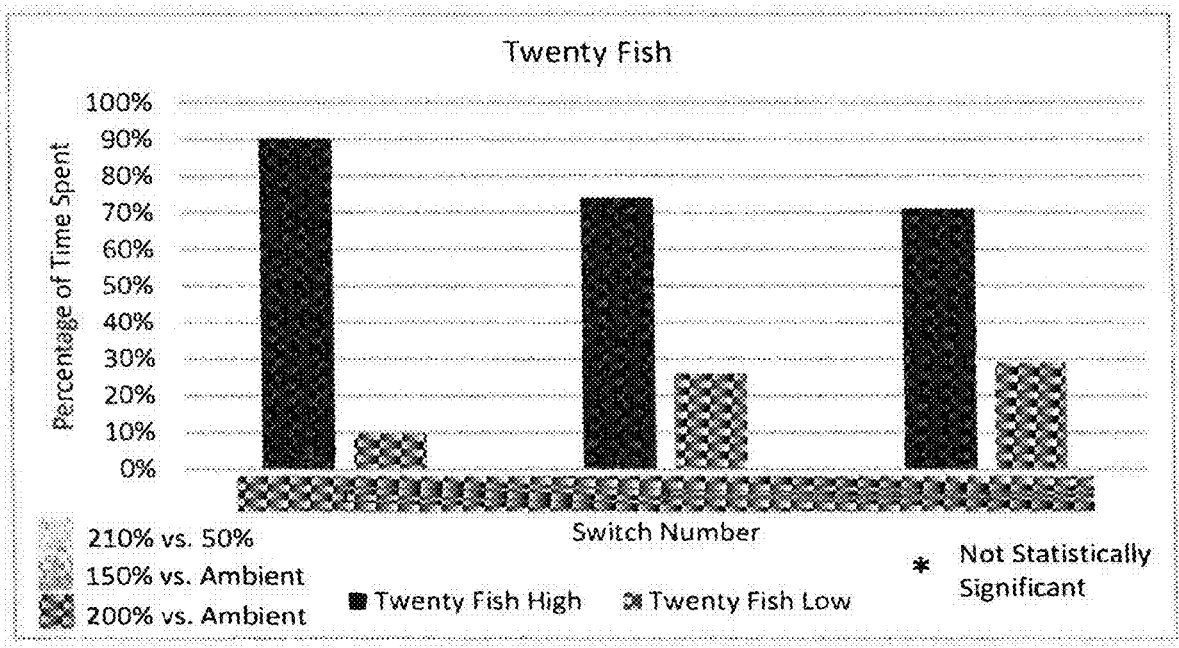

A summary of the data from the trials can be found in FIGS. 7 to 9 and in Tables 1-5 below.

5 of 26 switches were rejected, independent of results, based on their failure to reach the 90% confidence levels for the selected statistical analysis. 17 of 26 switches reached the 100% confidence level, and 4 of 26 switches were above the 90% confidence level.

Only one switch, single fish (n=1) demonstrated a reversal from expected, whereby the fish chose the low DO flume side over the high DO flume side for the majority recorded time. There was greater variability in the single fish trials over multiple fish trials, where 3 of the single fish switches did not meet the 90% confidence level (3 of the overall 5 trials rejected for not meeting the statistical threshold). All 3 of these switches occurred when the low DO levels were set at ambient DO (88%-90%). Analysis of these data often illustrates that some fish enter a hypo-active state when entering/found in hypoxic areas. This reduction of physical activity and failure to explore is most likely related to energy conservation.

Ten switches were carried out to assess whether fish avoided areas of low DO % (45-50% DO). All trials demonstrated a statistically significant behavior of avoidance, independent of n numbers (2 trials of 11 fish and 3 trials with 1 fish). The avoidance behavior supports the scientific literature for both controlled laboratory trials and field studies. It should be noted that in this study, high levels of DO % saturation did not result in an increase in total gas pressure (TGP).

Thirteen switches involved assessing whether fish preferred areas of high DO % over ambient DO % (88%-90%). Four of the switches did not meet the statistical cut off point of 90% confidence and 3 of these were with one fish (n=1 higher variability). Five of six switches with 10 fish (n=10)

demonstrated a choice to move to the higher DO % flume sides, while all (3/3) 20 fish switches (n=20) gave a strong preference for the high DO % areas over ambient conditions. The data from these trial sub-sets indicates that fish are attracted/prefer higher DO %'s.

Three switches were dedicated to investigating whether fish would choose moderately high levels of DO % (140%, 135%, 1nd 130%) over ambient DO % (90%). The 2 switches, at 135% and 130% vs. ambient, both resulted in a statistical fish preference/attraction to moderately high level DO % areas over ambient.

Test Conclusions

The inventors were able to identify the two most important confounding parameters influencing the outcome of avoidance/preference behaviors of healthy Atlantic salmon fry. The first confounding parameter identified was intermittent noise levels occurring outside the curtained area but still within the shared space. With the use of blue tooth technology, remote live video monitoring was employed for all trials, and technician observations verified that both; a. entrance to the shared room during a trial (opening and closing the door), and b. talking in a normal or loud voice level, all resulted in fish eliciting a "fight or flight" behavior and moving opposite to the noise source. The trials were carried out when little-to no levels of activity were being carried out in the shared space.

Furthermore, the reduction in fish handling due the automation of high/low switches outside the curtain area, removed the need for: a) acclimation periods for a given population of fish prior to each switch and b) the presence of a technician within the curtained area to physically exchange the flume side injection nozzles. The removal of these confounding parameters allowed for longer trial durations and multiple uninterrupted switches for any given population of fish being studied. The inventors did not find any right/left tank bias after mitigating these confounding parameters.

Within the 10 fish, 20 fish trials we did not observe schooling behaviors or social dynamics that influenced trial outcomes. However, in highly variable single fish trials (n=1) some entered a hypo-active state when entering the low DO flume, not moving or exploring, in what appeared to be related to energy conservation. We conclude that single fish trials are highly variable when studying behavioral responses in fish species which naturally elicit schooling or shoaling behaviors and a hierarchical social structure.

All ten switches carried out at low DO levels (45%-50% DO) demonstrated a statistically significant avoidance behavior, independent of n numbers (2 trials of 11 fish and 3 trials with 1 fish). The inventors observed a distinctive reversal avoidance behavior, comprised of a quick 180-degree flip, when fish encountered the low DO flume. This avoidance behavior satisfies study objective 1 and is further supported by the scientific literature for both controlled laboratory trials and field studies.

The second study objective, preference/attraction to DO levels above ambient, involved a total of thirteen switches. Four of the switches did not meet the statistical cut off point of 90% confidence and 3 of these were with one fish (n=1 higher variability). Five of six switches with 10 fish (n=10) demonstrated a statistically significant choice to move to the higher DO % flume sides, while all (3/3) 20 fish switches (n=20) gave a strong statistical preference for the high DO % areas over ambient conditions. The data from these trial sub-sets indicates that fish are attracted to higher DO %'s even when given the choice of sufficient ambient DO % waters.

Three switches were dedicated to investigating whether fish would choose moderately high levels of DO % (140%, 135%, 1nd 130%) over ambient DO % (90%). The 2 switches, at 135% and 130% vs. ambient, both resulted in a statistical fish preference/attraction to moderately high level DO % areas over ambient.

It should be emphasized that the findings within this report are based on proxy Atlantic salmon fry, hand reared under optimal oxygen concentrations, healthy and fed twice daily vs. wild fish populations. The latter group, prior to encountering a fish ladder, would have been off feed, migrated a long-distance encountering waters with suboptimal oxygen conditions, in addition to having major energy reserves reallocated to gonadal production. Mature wild fish are likely more sensitive to smaller incremental changes to DO % levels than young aquaculture salmon fry. Thus, the findings in this report would be greatly amplified in mature wild fish populations, with preference/attraction behaviors elicited to smaller incremental changes to DO % gradients.

The observed behaviors noted in this report support the conclusion that Atlantic salmon fry both avoid low DO % areas and prefer/are attracted to higher DO % areas. In that regard, generating higher DO % areas proximate to fish ladders and fish slides would help draw fish towards such structures and to navigate through them past the natural or artificial barriers.

Whereas a specific embodiment of the method is herein shown and described, variations are possible.

Accordingly, the invention should be understood to be limited only by the accompanying claims, purposively construed.

Fish Choice Trials Summary

TABLE 1

| Date | Jul. 4, 2018 | | | | | |
|---|---|---|---|---|---|---|
| Number of Fish | | 11 | | | | |
| Trial # 4 | DO High | DO Low | % Fish High | % Fish Low | T-Test | Confidence |
| 1st Switch | 200 | 45 | 82 | 18 | 2.00E−08 | 100% |
| 2cnd Switch | 200 | 45 | 71 | 29 | 7.00E−06 | 100% |
| Trial # 5 | | | | | | |
| 1st Switch | 200 | 45 | 83 | 17 | 1.00E−08 | 100% |
| 2cnd Switch | 200 | 45 | 60 | 40 | 4.00E−04 | 100% |
| Number of Fish | | 1 | | | | |
| Trial # 1 | DO High | DO Low | % Fish High | % Fish Low | T−Test | Confidence |
| 1st Switch | 210 | 50 | 67 | 33 | 3.00E−03 | 100% |
| 2cnd Switch | 210 | 50 | 69 | 31 | 1.00E−03 | 100% |
| Trail # 2 | | | | | | |
| 1st Switch | 210 | 50 | 71 | 29 | 3.00E−04 | 100% |
| 2cnd Switch | 210 | 50 | 80 | 20 | 1.00E−04 | 100% |
| Trial # 3 | | | | | | |
| 1st Switch | 210 | 50 | 67 | 33 | 3.00E−03 | 100% |
| 2cnd Switch | 210 | 50 | 60 | 40 | 8.70E−02 | 94% |

TABLE 2

| Date | Jul. 5, 2018 | | | | | |
| Number of Fish | 1 | | | | | |
| Trial #1 | DO High | DO Low | % Fish High | % Fish Low | T-Test | Confidence |
| --- | --- | --- | --- | --- | --- | --- |
| 1st Switch | 150 | 88 | 65 | 35 | 1.70E−03 | 100% |
| 2cnd Switch | 150 | 88 | 55 | 45 | 3.16E−01 | 81%** |

TABLE 3

| Date | Jul. 6, 2018 | | | | | |
| Number of Fish | 1 | | | | | |
| Trial #1 | DO High | DO Low | % Fish High | % Fish Low | T-Test | Confidence |
| --- | --- | --- | --- | --- | --- | --- |
| 1st Switch | 200 | 90 | 56 | 44 | 4.90E−01 | 71%** |
| 2cnd Switch | 200 | 90 | 40 | 60 | 2.77E−01 | 83%** |

| Number of Fish | 10 | | | | | |
| Trial #2 | DO High | DO Low | % Fish High | % Fish Low | T-Test | Confidence |
| --- | --- | --- | --- | --- | --- | --- |
| 1st Switch | 200 | 90 | 63 | 37 | 3.50E−02 | 97% |
| 2cnd Switch | 200 | 90 | 53 | 47 | 4.89E−01 | 64%** |

TABLE 4

| Date | Jul. 9, 2018 | | | | | |
| Number of Fish | 10 | | | | | |
| Trial #1 | DO High | DO Low | % Fish High | % Fish Low | T-Test | Confidence |
| --- | --- | --- | --- | --- | --- | --- |
| 1st Switch | 200 | 90 | 61 | 39 | 2.80E−02 | 98% |
| 2cnd Switch | 200 | 90 | 75 | 25 | 9.10E−07 | 100% |
| Trial #2 | | | | | | |
| 1st Switch | 200 | 90 | 81 | 19 | 8.70E−07 | 100% |
| 2cnd Switch | 200 | 90 | 82 | 18 | 9.70E−08 | 100% |

| Number of Fish | 20 | | | | | |
| Trial #3 | DO High | DO Low | % Fish High | % Fish Low | T-Test | Confidence |
| --- | --- | --- | --- | --- | --- | --- |
| 1st Switch | 200 | 90 | 90 | 10 | 7.8E−10 | 100% |
| 2cnd Switch | 200 | 90 | 74 | 26 | 4.70E−07 | 100% |
| 3rd Switch | 200 | 90 | 71 | 29 | 1.20E−06 | 100% |

TABLE 5

| Date | Jul. 10, 2018 | | | | | |
| Number of Fish | 10 | | | | | |
| Trial #1 | DO High | DO Low | % Fish High | % Fish Low | T-Test | Confidence |
| --- | --- | --- | --- | --- | --- | --- |
| 1st Switch | 140 | 90 | 53 | 47 | 5.50E−01 | 59%** |
| 2cnd Switch | 135 | 90 | 66 | 34 | 6.00E−04 | 100% |
| 3rd Switch | 130 | 90 | 57 | 43 | 1.19E−01 | 91% |

**Indicates below the 90% Confidence Level

The invention claimed is:

1. A system for managing fish migration in a body of water in the vicinity of an artificial or natural barrier, the system comprising:

a source of saturated water, the saturated water comprising water having a first gas dissolved therein to a level that is higher than that in the body of water;

a plurality of outlets in fluid communication with the source of saturated water, each outlet being positioned at a respective predetermined position in the body of water to eject the saturated water from the outlet and into the respective predetermined position to thereby provide regions of water with above ambient dissolved gas levels of the first gas at the predetermined positions, wherein said regions at the respective predetermined positions define a path for the fish to navigate around the barrier;

a pump in fluid communication with the source of saturated water and the one or more outlets for moving the saturated water from the source to the one or more outlets, wherein flow of the saturated water out of the one or more outlets into the body of water raises the dissolved gas level at the respective predetermined positions of the one or more outlets, thereby drawing the fish towards the predetermined positions;

a fish ladder positioned in the vicinity of the barrier for upstream migration of the fish past the barrier, the fish ladder including a ladder entrance positioned downstream of the barrier and a ladder exit positioned upstream of the barrier;

a fish monitoring system configured to record an entrance time for each fish entering the ladder, wherein the fish monitoring system is positioned proximate the ladder entrance, and wherein the flow of the saturated water is based on data from the fish monitoring system; and wherein the source of saturated water comprises a saturator configured to dissolve the first gas into the water and to remove a second gas from the water, thereby producing the saturated water.

2. The system of claim 1, wherein a fish slide is positioned in the vicinity of the barrier for downstream migration of the fish past the barrier, the fish slide including: a slide entrance positioned upstream of the barrier, and a slide exit positioned downstream of the barrier, wherein a predetermined position of the respective predetermined positions is located proximate the slide entrance so that outlet corresponding to the predetermined position is positioned proximate the slide entrance.

3. The system of claim 1, wherein another one of the predetermined positions is located proximate the ladder entrance so that outlet corresponding to the another one of the respective predetermined positions is positioned proximate the ladder entrance.

4. A system for managing fish migration in a body of water in the vicinity of an artificial or natural barrier, the system comprising:

a source of saturated water, the saturated water comprising water having a first gas dissolved therein to a level that is higher than that in the body of water;

a plurality of outlets in fluid communication with the source of saturated water, each outlet being positioned at a respective predetermined position in the body of water to eject the saturated water from the outlet and into the respective predetermined position to thereby provide regions of water with above ambient dissolved gas levels of the first gas at the predetermined positions, wherein said regions at the respective predetermined positions define a path for the fish to navigate around the barrier;

a pump in fluid communication with the source of saturated water and the one or more outlets for moving the saturated water from the source to the one or more outlets, wherein flow of the saturated water out of the one or more outlets into the body of water raises the dissolved gas level at the respective predetermined positions of the one or more outlets, thereby drawing the fish towards the predetermined positions;

a fish slide positioned in the vicinity of the barrier for downstream migration of fish past the barrier, the fish slide including: a slide entrance positioned upstream of the barrier, and a slide exit positioned downstream of the barrier, wherein a predetermined position of the respective predetermined positions is located proximate the slide entrance so that outlet corresponding to the predetermined position is positioned proximate the slide entrance;

a fish ladder positioned in the vicinity of the barrier for upstream migration of the fish past the barrier, the fish ladder including: a ladder entrance positioned downstream of the barrier and a ladder exit positioned upstream of the barrier, and wherein another one of the predetermined positions is located proximate the ladder entrance so that outlet corresponding to the another one of the respective predetermined positions is positioned proximate the ladder entrance;

a fish monitoring system configured to record an entrance time for each fish entering the ladder, wherein the fish monitoring system is positioned proximate the ladder entrance, and wherein the flow of the saturated water is based on data from the fish monitoring system; and wherein the source of saturated water comprises a saturator configured to dissolve the first gas into the water and to remove a second gas from the water, thereby producing the saturated water.

5. The system of claim 4, wherein a further one of the predetermined positions is located proximate the ladder exit so that outlet corresponding to the further one of the respective predetermined positions is positioned proximate the ladder exit.

6. The system of claim 5, wherein a still further one of the predetermined positions is located between the ladder entrance and the ladder exit so that outlet corresponding to the still further one of the respective predetermined positions is positioned between the ladder entrance and the ladder exit.

7. The system of claim 6, wherein each outlet includes a control valve for selectively controlling the ejection of saturated water therefrom to raise the gas dissolved gas level to 10-25% above ambient dissolved oxygen levels at the respective predetermined positions in the body of water.

8. The system of claim 7, wherein the pump is in fluid communication with the saturator and a head pond upstream of the barrier, the pump being adapted to direct unsaturated water from the head pond to the saturator.

9. The system of claim 4, further comprising a plurality of sensors for detecting the dissolved gas level of the first gas at each of the predetermined positions, wherein each sensor is positioned immediately downstream of a corresponding outlet of the plurality of outlets.

\* \* \* \* \*